March 17, 1959  C. E. SIMMONS  2,878,036
SHOCK-ABSORBING TRAILER HITCH
Filed Oct. 17, 1957
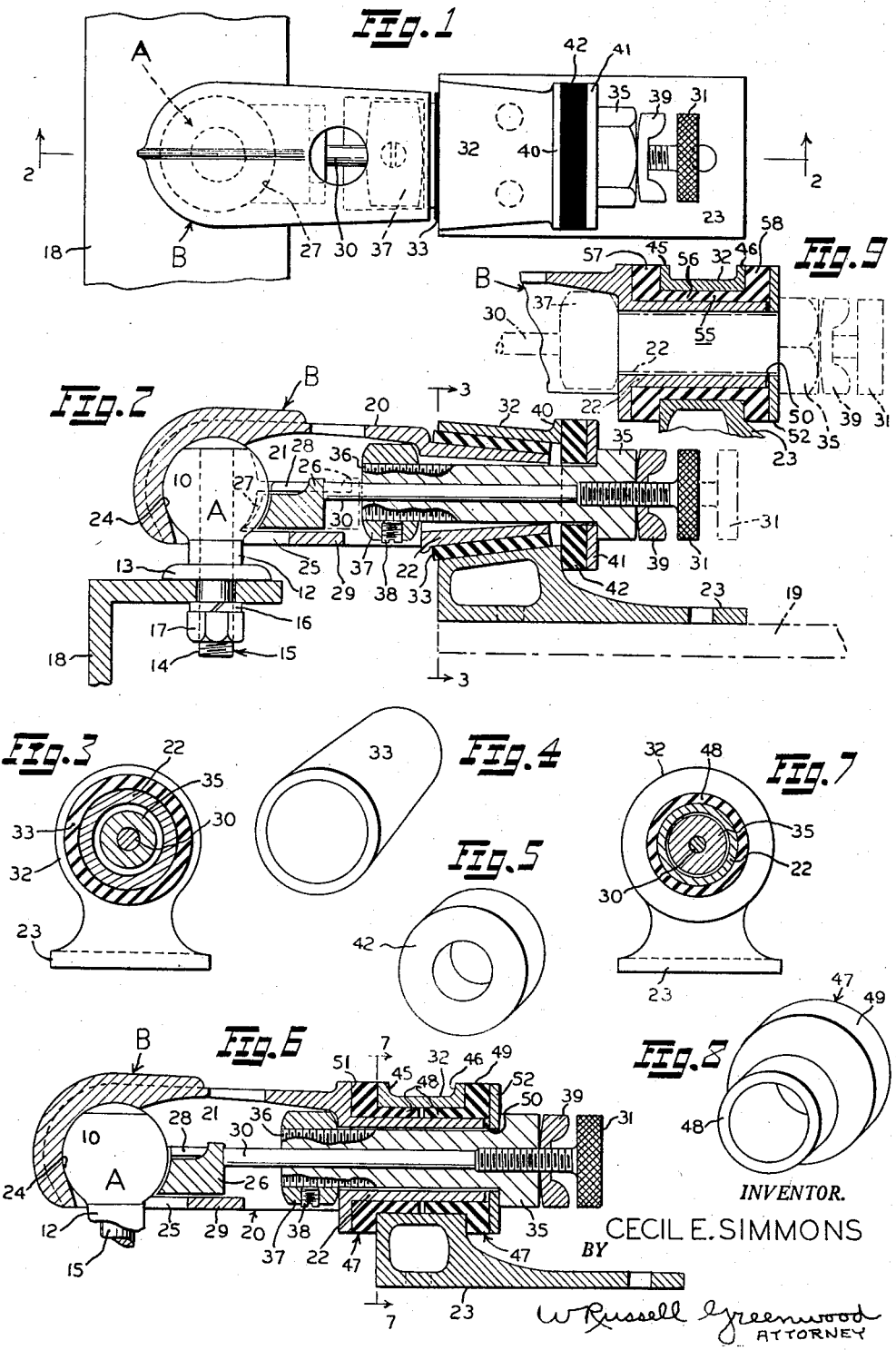
INVENTOR.
CECIL E. SIMMONS
BY
W Russell Greenwood
ATTORNEY United States Patent Office 2,878,036
Patented Mar. 17, 1959

2,878,036

SHOCK-ABSORBING TRAILER HITCH

Cecil E. Simmons, Oshawa, Ontario, Canada

Application October 17, 1957, Serial No. 690,833

4 Claims. (Cl. 280—485)

This invention relates to improvements in automobile trailer hitches of the type adapted for use with pleasure cars for towing trailer coaches, house trailers, light utility trailers, etc. More especially, it pertains to a novel load-cushioned or shock-absorbing mounting construction for the ball socket coupler bar member of such type of trailer hitch in which resilient natural or synthetic rubber, in compression, is incorporated in the coupler mounting arrangement for the purpose of absorbing in compression axially and radially applied road shocks and vibrations so as to prevent their transfer to the towing vehicle and to their trailer chassis when the two connected vehicles are moving over uneven or bumpy road surfaces.

One object of the present invention is to provide a draw-bar coupler unit incorporating a shock-absorbing mounting means by the use of which the above objections will be overcome. To this end, and in accordance with one feature of the invention, a ball-type trailer hitch has been provided at one extremity with a shock-absorbing mounting by which the coupler member of the hitch is adapted to be affixed to a rigid part of the vehicle to be towed.

Further objects and advantages of the invention will appear from the following description when taken in conjunction with the accompanying drawings, and the novel features will be particularly pointed out in the appended claims.

In the drawings:

Fig. 1 is a top plan view of a trailer hitch having the present invention applied thereto;

Fig. 2 is a central longitudinal section of the trailer hitch shown in Fig. 1, taken substantially on the line 2—2 of Fig. 1 and looking in the direction of the arrows;

Fig. 3 is a vertical sectional view taken substantially on the line 3—3 of Fig. 2 looking in the direction of the arrows;

Fig. 4 is a perspective view of the frusto-conical rubber bushing associated with the coupler mounting structure illustrated in Fig. 1;

Fig. 5 is a perspective view of the rubber thrust washer employed in the Fig. 1 coupler mounting structure;

Fig. 6 is a central longitudinal sectional view similar to Fig. 2, but illustrating a modified form of load-cushioned or shock-absorbing coupler mounting structure;

Fig. 7 is a vertical sectional view taken substantially on the line 7—7 of Fig. 6 looking in the direction of the arrows;

Fig. 8 is a perspective view of one of a pair of flanged rubber bushings associated with the Fig. 6 coupler mounting structure; and Fig. 9 is a fragmentary view in longitudinal section through the coupler mounting support showing a modified form of cushioned shock mount.

Referring now more specifically to the drawings and in particular to Figs. 1 and 2 thereof, it will be seen that the form of hitch arrangement there shown consists of two main units A and B, of which the one herein designated A is the usual coupling ball assembly which is permanently and rigidly attached either to the rear bumper (not shown) or to an extended part of the framework at the rear of the towing vehicle, such as an automobile (not shown). The unit A consists of a conventional spherical coupling ball 10 which is formed integral on a stem 12 having a circular foot or collar 13 at its lower end serving as an abutment about the threaded shank 14 of the usual spherical-headed clamping bolt 15 which passes through the ball 10 and its stem 12, and this foot 13 forms an abutment which coacts with a lock washer 16 and a suitable nut 17 having threaded connection on the lower end of the bolt 15 to hold the coupling ball 10 fixed to a bracket 18 which is permanently attached in a known manner to the towing vehicle.

The unit B comprises the elongated ball-housing towbar member or drawbar coupler of the hitch which is permanently and rigidly attached to the customary tongue, as indicated in broken outline at 19, Fig. 2, of a trailer vehicle (not shown) and, in this instance, embodies the novel shock-absorbing mounting structure of the present invention.

The drawbar coupler unit B comprises an elongated hollow rigid bar-like body portion 20 having a longitudinally-extending vertically-walled chamber 21 communicating with a reduced tubular stub extension 22 at one end extremity which carries a bracket member 23 for supporting the drawbar coupler in an extended overhanging relationship when bolted to a draw member or tongue 19 of the towed vehicle. At the other end, the body portion of the drawbar coupler is provided interiorly with a partial spherical surface to form a socket 24 which is open downwardly as indicated at 25 to removably receive and seat the spherical coupling ball 10 that is positionable in said socket by insertion through the bottom opening 25 of the body portion 20.

A locking block 26 formed with a spherically concaved end face as indicated at 27 adapted to engage under the lower spherical surface of the coupling ball element 10 when housed within the coupler B, is slidably mounted within the chamber 21 and guided between a pair of opposed horizontal internal ribs 28, one of which is shown in Fig. 2, and the bottom or transverse web portion 29 of the body portion 20 for movement toward and from the ball socket 24.

Adjustable means here shown as a threaded rod member 30 extend axially of the body portion 20 and its tubular stub 22 into the chamber 21 and may have its inner end pivotally connected to the locking block 26 for advancing and retracting the latter when the rod member 30 is turned in an appropriate direction by means of its knurled head flange 31. If desired, the inner end of the rod member 30 may be reduced and inserted into the end face of the locking block 26, whereby it only can propel the latter by a pushing movement.

To prevent transfer of road shocks to the towing vehicle, an important feature of the present invention is the provision of a resilient cushioning structure for supporting and mounting the stub 22 of the coupler B in its attaching bracket 23. To this end, the tubular stub extension 22 passes through an annular eye portion 32 having flanges at one or both ends, and said eye being integral with and upstanding from the bracket 23 and interposed between the inner circumferential surface of this eye 32 and the outer circumferential surface of the stub extension 22 is a mass of resilient rubber as indicated at 33 which serves to absorb and cushion any shock which might be transmitted through the drawbar coupler unit B from its bracket 23.

In the embodiment depicted in Fig. 2, the inside face of the eye 32 and the outer peripheral surface of the tubular stub extension 22 are of tapered formation and consequently the rubber mass 33 is a sleeve which is frusto-conical in shape (see Fig. 4). In the modified forms of mounts shown in Figs. 6 and 9, the inside faces of the eyes 32 and the outer peripheral surfaces of the respective stub extensions 22 are cylindrical in formation and thus the body portions of the rubber masses 33 inserted therebetween will be of cylindrical shape.

Referring again to Fig. 2, the rod member 30 extends through and is rotatably and threadingly mounted in the bore of a tubular, hexagonal head cap screw 35 having an exteriorly threaded shank 36 which is inserted axially through the tubular stub extension 22 to project within the chamber 21 where it is secured in position by means of a square nut 37 having threaded connection onto the inner end of the shank 36 and held thereto by a set screw 38. A wing nut 39 threaded on the rod 30 between the flange 31 thereof and the head portion of the cap screw 35 holds the rod member 30 and locking block 26 locked in position after the coupler unit B has been connected to the ball 10 of unit A.

Means are provided to cushion the coupler unit B against transmission thereto of axial thrusts from the trailer motion arising from road shocks, etc. As illustrated in Figs. 1 and 2, the eye 32 is provided with an end flange 40 between which and a metal washer 41 is held under compression a resilient rubber thrust washer 42, both washers encircling the shank 36 of the cap screw 35 with the outer face of the washer 41 in engagement with the shouldered bearing surface of the hexagonal head of the cap screw 35. Axial tightening or loosening of the cap screw 35 changes the longitudinal extent to which the stub extension 22 is drawn into the eye 32 thereby varying the degree of compression on both rubber elements 33 and 42, thus enabling the initial compression of such elements to be adjusted readily to suit the weight or load conditions of the towed vehicle or trailer. The vertical walls of the chamber 21 serve to prevent the square nut 37 from turning on the end of the cap screw 35 when the latter is being adjusted to compress the resilient rubber elements 33 and 42.

Fig. 6 shows a modified cushioned mounting arrangement of the drawbar coupler unit B which differs from that just described in that the eye 32 of the mounting bracket 23 is flanged at both ends as indicated at 45 and 46, and the resilient rubber shock-absorbing structure is in the form of a pair of bushings 47, each having a sleeve-like body portion 48 with an enlarged annular flange 49 at one end. The sleeve portions 48 of the respective bushings are inserted into the eye 32 from opposite sides thereof and have their respective flanges 49 disposed exteriorly of the eye 32 and in contact with the flanges 45 and 46 respectively thereof. In this arrangement the tubular stub extension 22 of the drawbar coupler B is inserted through both sleeves 48 but has its end terminating at a point which will leave a slight clearance as indicated at 50 to allow the flanges 49 to be placed in a state of compression, one by means of the shoulder 51 and flange 45 of the eye 32, and the other by means of an annular metal washer 52 on the cap screw 35 and flange 46 of the eye 32, when the adjustment of the cap screw 35 is effected in a manner similar to that employed in the Fig. 2 construction.

In the modification shown in Fig. 9, the cushioning member consists of a resilient rubber sleeve 55 having a cylindrical body portion 56 with an annular flange 57 at one end and an annular flange 58 at the other end. In this arrangement, the cushioning member 55 may be molded integral within the eye 32 of the bracket 23 and with the resilient rubber flanges 57 and 58 disposed exteriorly about the opening of the eye 32. After insertion of the tubular stub extension 22 of the drawbar coupler B, the flanges 57 and 58 are placed in a desired state of compression in a manner similar to that employed in compressing the flanges 49 of the rubber bushings 47 in the Fig. 6 construction previously described.

It will be apparent, therefore, from the foregoing description that the constructions of both the Figs. 2, 6 and 9 forms of the invention are such that the frusto-conical rubber sleeve element 33 and the rubber sleeve body portions 48 and 56 respectively of the resilient rubber cushioning elements 47 and 55 absorb in compression any vertically applied shocks and vibrations transmitted radially from the tongue 19 of the towed vehicle, and absorb in shear any shock or vibration which is laterally applied. Likewise, the rubber washer 42, the annular rubber end flanges 49 of the rubber bushings 47, or the flanges 57 and 58 of the rubber sleeve 55, absorb in compression any endwise thrust or axially applied shocks or vibrations.

By virtue of the arrangements above-described, a complete self-contained inherently shock and vibration absorbing trailer hitch or coupling has been provided which is secure against any shearing action, and at the same time provides a means for cushioning the shocks and vibrations and materially reduces road noises.

What is claimed is:

1. In a detachable ball-type trailer hitch for use in connecting a trailer vehicle to a towing vehicle, a coupler drawbar unit for attachment to the trailer vehicle, said coupler drawbar comprising a rigid elongated hollow body of metal having an open upwardly-extending socket in the vicinity of one end adapted to detachably receive and seat the usual coupling ball normally affixed upright to a rigid member at the rear of a towing vehicle, the other end of said drawbar coupler being formed with a flange and a tubular stub extension projecting axially therefrom, a mounting bracket including an upright eye, said bracket being carried by the stub extension and adapted to be affixed to the trailer vehicle, said eye being in radially spaced relation thereto and having an outwardly directed radial flange at one end thereof, a sleeve-like body of resilient rubber in a state of compression between the inside peripheral surface of said eye and the outside peripheral surface of said stub extension and in contact with both of said surfaces, an annular body of resilient rubber coaxial with said eye and said stub extension and disposed exteriorly of the eye and held under compression in endwise contact against the end face of said flange of the eye, and means including a flanged element adjustable axially to said stub extension and operatively arranged to effect a desired compression of both bodies of resilient rubber.

2. In a detachable ball-type trailer hitch for use in connecting a trailer vehicle to a towing vehicle, a drawbar coupler unit comprising an elongated hollow rigid bar-like member provided in the region of one end extremity with a socket open downwardly to admit and removably receive and seat the usual spherical coupling ball member rigidly fixed to the towing vehicle, locking means operative to detachably retain said ball in said socket, the other end portion of said coupler drawbar being formed with a flange and a tubular stub extension projecting therefrom for supporting the coupler drawbar in an outwardly extended fashion from an end mount, a mounting bracket carried by said stub extension and forming the end mount for said drawbar coupler and adapted to be affixed to a towing vehicle, said mounting bracket including an upstanding annular eye integral therewith and having a flange at one end thereof, said eye being coaxial with and encircling said stub extension and being radially spaced thereto, a resilient rubber sleeve in a state of compression between and in contact with the opposed inner and outer peripheral surfaces of said eye and stub extension, respectively, an axial thrust washer of resilient rubber in a state of compression disposed exteriorly and axially of said eye effective to cushion said stub extension and said eye from each other against the impact of axial thrusts, and adjustable means comprising a shouldered tubular cap screw having its head adjacent said rubber washer and adjustable within the bore of said tubular stub extension and an annular flanged element in contact with said resilient rubber washer and carried by and movable with said cap screw to effect and hold said rubber sleeve and rubber washer in a desired state of compression in said eye and against said flange thereof, respectively.

3. In a trailer hitch, the combination of a drawbar coupler unit having a tubular stub extension at one end extremity thereof, a mounting bracket carried by said stub extension and adapted for attachment to a rigid trailer-fixed draw member and for supporting the drawbar coupler unit thereon in a longitudinally extended overhanging relationship thereto, said mounting bracket having an upright eye rigid therewith and encircling said stub extension, said eye having an annular end flange, resilient rubber elements in a state of compression isolating said eye radially and axially from said stub extension, and adjustable means for effecting a desired compression of said resilient rubber elements, said resilient rubber elements being effective to cushion said drawbar unit from the impact of severe road shocks and jolts that may be transmitted radially and axially thereto through said bracket from a trailer vehicle, the resilient rubber element which is in a state of compression and isolating the eye radially from said stub extension being in the form of a sleeve interposed between said stub extension and said eye and engaged against the outer and inner circumferential surfaces respectively thereof, and the resilient rubber element which is in a state of compression and isolating the eye axially from said stub extension being of annular form and held under axial compression in endwise engagement against the annular face of said end flange of the eye.

4. In a trailer hitch, the combination of a drawbar coupler unit having a stub extension at one end extremity thereof, a mounting bracket carried by said stub extension and adapted for attachment to a rigid trailer-fixed draw member and for supporting the drawbar coupler unit thereon in a longitudinally extended overhanging relationship thereto, said mounting bracket having an upright eye rigid therewith and encircling said stub extension, said eye having an annular end flange, the inner circumferential surface of said eye and the outer circumferential surface of said stub extension respectively each being similar surfaces of revolution, resilient rubber elements in a state of compression isolating said eye radially and axially from said stub extension, and adjustable means for effecting a desired compression of said resilient rubber elements, said resilient rubber elements being effective to cushion said drawbar coupler unit from the impact of severe road shocks and jolts that may be transmitted radially and axially thereto through said bracket from a trailer vehicle, the resilient rubber element which is in a state of compression and isolating the eye radially from said stub extension being in the form of a sleeve disposed interiorly of the eye and having inner and outer peripheral surfaces engaged with and corresponding respectively to said circumferential surfaces of revolution of said stub extension and of said eye, and the resilient rubber element which is in a state of compression and isolating the eye axially from said stub extension being of annular form disposed exteriorly of said eye and held under axial compression in endwise engagement against the annular face of said end flange of the eye.

References Cited in the file of this patent
UNITED STATES PATENTS

| | | |
|---|---|---|
| 2,189,170 | Gaussoin | Feb. 6, 1940 |
| 2,290,678 | Dodge | July 21, 1942 |
| 2,414,743 | Kaemmerling | Jan. 21, 1947 |
| 2,513,932 | Grube | July 4, 1950 |